Aug. 19, 1969 L. N. HOLZMAN 3,462,560

SUBSCRIBER TELEPHONE CIRCUIT WITH RESISTANCE
HYBRID SIDETONE BALANCING NETWORK
Filed April 6, 1966

INVENTOR
L. N. HOLZMAN
BY
ATTORNEY

United States Patent Office 3,462,560

Patented Aug. 19, 1969

3,462,560

SUBSCRIBER TELEPHONE CIRCUIT WITH RESISTANCE HYBRID SIDETONE BALANCING NETWORK

Louis N. Holzman, Lincroft, N.J., assignor to Bell Telephone Laboratories, Incorporated, New York, N.Y., a corporation of New York Filed Apr. 6, 1966, Ser. No. 540,643
Int. Cl. H04b 3/38, 3/58
U.S. Cl. 179—170 8 Claims

ABSTRACT OF THE DISCLOSURE

A telephone station set speech network employs a resistive hybrid transmission circuit with a first transistor amplifier in the receiving circuit and a second transistor amplifier in the transmitting circuit. The set impedance is made essentially resistive at normal telephone voice channel frequencies by utilizing the amplifier of the receiving circuit to isolate the impedance of the receiver from the resistive hybrid circuit.

Figure 1:
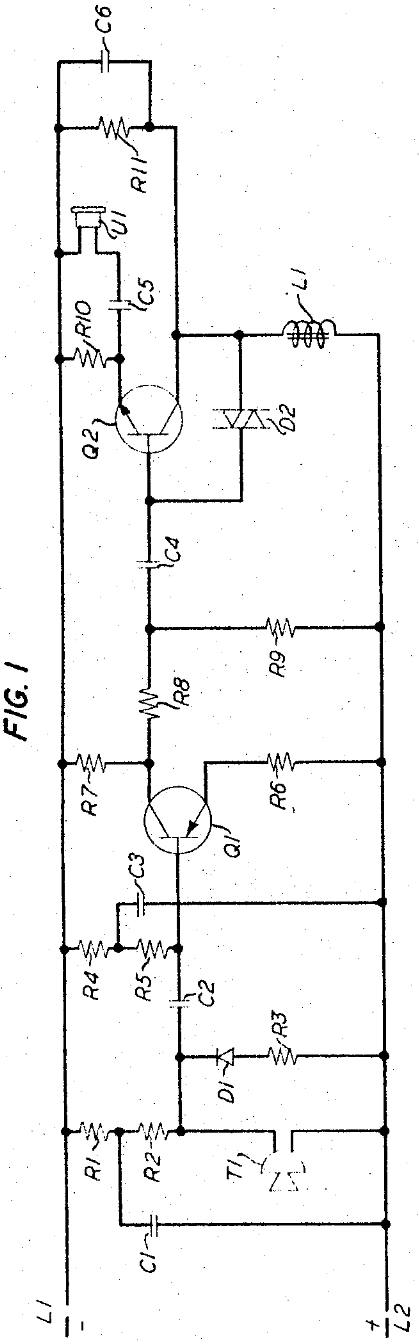

This invention relates to telephone set voice circuits and more particularly to voice circuits utilizing resistance hybrid sidetone balancing networks.

Two-wire subscriber telephone circuits are typically arranged in hybrid type configurations with the transmitter and receiver units mutually conjugate. As a result, signals generated either in the transmitter or in the receiver are substantially, but not entirely, muted in the other. More specifically, speech signal energy generated by the transmitter divides between adjacent inductance coil legs in proportion to the impedance match between the network and the line, one portion of the energy being applied to the line and the other portion being dissipated in the balancing network. Owing to the relative polarities of the interconnected coils, their inductive effects tend to cancel so that very little sidetone energy is coupled into the third coil of the hybrid. The proper level of sidetone that imparts a quality of natural or direct conversation to telephone speech is established by controlling the impedance match between the network and the line.

As a result of the undesirably large bulk and high cost of telephone set hybrid induction coils, voice circuits omitting such coils have been devised, the hybrid function being performed instead by a resistive network. Such circuits are shown, for example, in Patent 2,838,612 issued to L. C. Pocock June 10, 1958 and in Patent 3,170,043 issued to L. A. Hohmann, Jr. Feb. 16, 1965. The elimination of hybrid coils from telephone speech networks has become increasingly attractive owing to recent advances in the art of integrated and thin film circuitry whereby both fabrication cost and circuit size can be substantially reduced, particularly when requirements for induction coils are decreased or eliminated.

Despite these advantages, however, a number of heretofore unsolved problems have stood in the way of any widespread commercial adoption of resistive voice network hybrid circuits. For example, the essentially resistive set-impedance necessary to facilitate the desired degree of impedance match between the set and the line is made difficult to attain owing to the inductive reactance of conventional receiver units. A further problem relates to the need for rendering the D-C input of the set substantially independent of the resistance of the carbon transmitter in that the impedance characteristics of such units tend to be erratic. These problems are further complicated in those sets utilizing amplifying means such as a transistor or a plurality of transistor amplifier stages in combination with the telephone transmitter.

Accordingly, one object of the invention is to isolate the receiver's impedance from the resistive hybrid network in a telephone set voice network.

Another object is to eliminate the function of the transmitter impedance in determining the D-C resistance of a telephone set that utilizes a resistive hybrid network.

An additional object is to retain a relatively high A-C set-impedance in a telephone set despite the replacement of hybrid coils with a resistive hybrid circuit.

These and additional objects are achieved in accordance with the principles of the invention in a telephone voice circuit employing a resistance hybrid in which the conjugate receiver and transmitter branches each include a respective transistor amplifier. The remaining four branches comprise three individual resistor legs and the loop to which the circuit is connected. Exceptionally accurate sidetone balance is attained in that the conjugacy between the transmitter and receiver branches is independent of their impedances and depends instead only on the balance between resistive branch pairs and the impedance which appears across the input terminals of the circuit.

In accordance with the invention, the receiver transistor amplifier serves a unique function is that it isolates the receiver impedance from the rest of the hybrid bridge circuit and presents a relatively high impedance at its input. A particular aspect of the invention concerns the utilization of only a single inductor in a telephone voice circuit—that inductor being connected in the collector and base circuit of the common collector single transistor receiver amplifier. The inductor provides a high A-C impedance at voice frequencies while, at the same time, providing a sufficiently low D-C resistance so that linear operation of the amplifier is assured.

One feature of the invention relates to a telephone subscriber's set having a carbon granule type transmitter wherein the D-C input resistance of the set is made substantially independent of the resistance of the transmitter.

Another feature involves a resistive hybrid network for the voice circuit of a telephone set wherein the conjugacy between the transmitter and receiver branches is independent of their impedances, depending instead only upon a balance between purely resistive branches of the hybrid and the impedance appearing across the input terminals of the circuit.

A further feature involves the combination in a telephone voice circuit of a transistor transmitter amplifier, a resistive hybrid network and a transistor receiver amplifier, the latter amplifier serving the primary function of isolating the receiver impedance from the rest of the hybrid bridge network and thereby presenting a relatively high impedance at its input.

Figure 2:
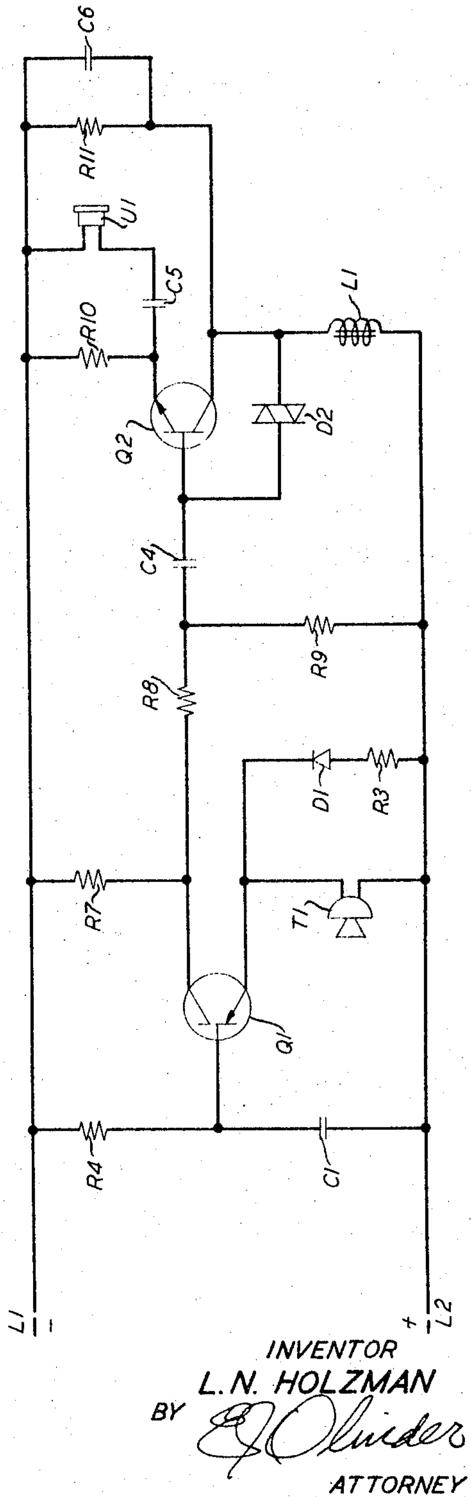

The principles of the invention as well as additional objects and features thereof will be fully apprehended from the following detailed description of two illustrative embodiments and from the drawing in which:

FIG. 1 is a schematic circuit diagram of a first embodiment of the invention; and FIG. 2 is a schematic circuit diagram of a second embodiment of the invention.

The circuit of FIG. 1 utilizes a carbon granule type of transmitter T1 bridged across the telephone lines L1 and L2 in series with resistors R1 and R2. Excitation current from transmitter T1 is obtained by way of the resistors R1 and R2. The resistance magnitude of these resistors is selected to limit the transmitter current to a maximum which may vary from approximately one to two milliamperes depending upon the characteristics of the subscriper's loop. The output of transmitter T1 is applied to the base of an amplifying transistor Q1 by way of a coupling capacitor C2. Transistor Q1 is connected in common emitter configuration. The direct current operating point of transistor Q1 is established by resistors R4 and R5, which are connected in series relation between the base of transistor Q1 and the line L1, and by resistor R6 which is connected between the emitter of transistor Q1 and the line L2. The base circuit of transistor Q1 is decoupled from the line terminals by the combination of resistors R4 and R5 and capacitor C3. Such decoupling prevents signal feedback to the base from the collector circuit of transistor Q1. If such feedback were permitted, it would have the effect of decreasing the collector circuit impedance and transmitter circuit gain. Capacitor C1, connected between the junction of resistors R1 and R2 and the line L2, is used to prevent signal feedback to the base of transistor Q1 through the transmitter circuit and the coupling capacitor C2.

Direct current equalization for the transmitter portion of the circuit is effected by the series combination of diode D1 and resistor R3 which is connected between the negative side of coupling capacitor C2 and line L2. The varistor action of diode D1 causes its forward resistance to reduce as the voltage across it increases. Thus, as the loop to which the circuit is connected is made shorter, the D-C flow increases and transmitter T1 is shunted by a smaller resistance.

The receiver branch of the circuit utilizes a transistor amplifier Q2 in common collector configuration. The receiver U1 is connected in series with a coupling capacitor C5 between the emitter of transistor Q2 and the line L1. Alternating current decoupling of the collector circuit of transistor Q2 is effected by the parallel combination of resistor R11 and capacitor C6, connecting the collector of transistor Q2 to the line L1. Such decoupling prevents any instantaneous change in direct current through the receiver and thus affords protection against the possibility of dialing clicks in the receiver. In accordance with the invention, the function of transistor Q2 is to isolate the receiver U1 impedance from the rest of the bridge and to present a high impedance at its input. A decoupling inductor $L_1$ is utilized to provide a high A-C impedance at voice frequencies and also to provide a sufficiently low D-C resistance so that linear operation of the amplifier is assured.

A varistor D2 provides for receiver circuit equalization. As the loop current increases with decreasing loop length, the terminal voltage across the circuit increases. The varistor impedance decreases with increasing varistor current. The signal current passing into the base of transistor Q2 is, therefore, shunted by a resistance which is reduced as the loop current increases. A second effect of the decreasing varistor impedance is an increase in the proportion of the total circuit current taken by the receiver amplifier as the loop current increases. Capacitor C4 in the base circuit of transistor Q2 accomplishes a degree of receiver circuit frequency response shaping by limiting the occurrence of low frequency peaks.

Viewed as a whole, the configuration of the circuit is that of a Wheatstone bridge circuit in which the receiver and transmitter branches are conjugates. The remaining four branches are the three hybrid resistors R8, R7 and R9 and the loop, not shown, to which the telephone is connected. Ideally, the transmitter and receiver branches are considered to have such high terminal impedances that they do not have any effect on the impedances presented by the complete circuit to its loop. If the active branches have impedances of the same order of magnitude as other branches in the bridge, however, the total circuit impedance becomes a function of the active branch impedances. In accordance with the invention, conjugacy between the transmitter and receiver branches is independent of the impedances of these branches and depends instead only on the balance between the branch pairs resistors R7, R9 and R8 and the impedance which appears across the input terminals of the circuit. The impedance across the input terminals is made up of the loop impedance in parallel with impedances of the telephone circuit other than the bridge which appears across the line terminals.

Optimum sidetone balance may be achieved in accordance with the invention by selecting the resistance magnitudes of resistors R7, R8 and R9 on the basis of certain requirements established by the circuit designer. These requirements include a preselected level of attenuation of signal energy between the input terminals and the receiver, the occurrence of maximum sidetone balance for a preselected loop impedance, such as 900 ohms for example, and the fixing of the input impedance of the circuit as viewed from its connecting loop at a preselected level, which may be on the order of 900 ohms of resistance in the voice frequency band, for example. From such requirements a set of simultaneous equations may readily be derived with their solution leading to a determination of the specific resistance magnitudes of resistors R7, R8 and R9.

The circuit of FIG. 2, which constitutes a second embodiment of the invention, is substantially identical to the circuit of FIG. 1 with the exception of certain features of the transmitter branch. Circuit components in FIG. 2 performing functions similar or identical to those performed by components of FIG. 1 are indicated by the same designating characters. The transmitter T1 in FIG. 2 is placed in the emitter circuit of amplifying transistor Q1 and the base of transistor Q1 is grounded for A-C signals through a relatively large capacitor C1. The circuit is thus an amplifier of the common base configuration.

In the circuit of FIG. 2 the decoupling capacitors C3 and C1 are provided to reduce signal feedback in the collector-to-base circuit. Such decoupling, however, tends to lose effectiveness at the low end of the voice frequency band and, accordingly, reduces the input impedance of the telephone circuit at low frequencies. Under certain loop conditions the single relatively large bypass capacitor Cl of the circuit of FIG. 2, is more effective than the decoupling circuit of FIG. 1 in reducing feedback from the collector at low frequencies. In addition, the circuit of FIG. 2 requires fewer circuit components. Excitation current for the carbon transmitter T1 is the emitter current for transistor Q1. This arrangement makes the D-C resistance of the telephone circuit somewhat more dependent on the transmitter resistance than is the case with the circuit shown in FIG. 1. The A-C impedance of the transmitter branch is sufficiently large however, that the carbon resistance has a negligible effect on circuit impedance. Extensive experiments with the circuits shown in FIGS. 1 and 2 indicate that they retain substantially all of the desirable speech transmission performance characteristics of current conventional telephone sets using hybrid coil arrangements. Additionally, circuits in accordance with the invention achieve an input impedance characteristic which appears as a fixed resistance level in the voice frequency band. In one illustrative circuit, components were selected to fix this level at 900 ohms. It has also been determined that the return loss of circuits in accordance with the invention is approximately 15 db greater than that of conventional sets at 1,000 cycles per second connected on a relatively short loop, terminating at 900 ohms. In both circuits in accordance with the invention, the D-C input resistance is substantially independent of the resistance of the carbon transmitter and may be fixed at approximately 200 ohms, for example, for all loop currents.

It is to be understood that the embodiments described herein are merely illustrative of the principles of the invention and that various modifications thereto may be effected by persons skilled in the art without departing from the spirit and the scope of the invention.

What is claimed is:

1. A telephone station set speech network comprising, in combination, first and second leads adapted for connection to a telephone line, a transmitter and at least one first resistive element connected in series relation between said leads, a first transistor having a base, a collector and an emitter electrode, a second resistive element connecting said collector electrode to one of said leads and a third resistive element connecting said emitter electrode to the other of said leads, a first capacitive element connecting the junction of said transmitter and said first element to said base electrode, a second transistor having second base, emitter and collector electrodes, a fourth resistive element connecting said second emitter electrode to one of said leads, an inductive element connecting said second collector electrode to the other of said leads, and means connecting said collector electrode of said first transistor to the base electrode of said second transistor.

2. Apparatus in accordance with claim 1 wherein said means comprises a fifth resistive element connecting the collector of said first transistor to one of said leads, a sixth resistive element and a second capacitive element in series relation connected between the collector electrode of said first transistor and the base electrode of said second transistor and a seventh resistive element connected between the junction of said sixth resistive element and said second capacitive element and said other lead.

3. Apparatus in accordance with claim 1 including a D-C equalization circuit connected between the junction of said first resistive element and said first capacitive element and said other lead.

4. Apparatus in accordance with claim 1 including a receiving equalization circuit connected between said base and collector electrodes of said second transistors.

5. A telephone set voice circuit comprising, in combination, first and second telephone lines, a first transistor in common emitter configuration connected across said lines, a transmitter connecting the emitter of said transistor to one of said lines, a first resistive element connecting the collector of said transistor to one of said lines, a second resistive element and a first capacitive element in series relation bridged between said lines, the junction of said last named elements being connected directly to the base of said transistor, a second transistor in common collector configuration connected across said lines, a third resistive element connected between said one of said lines and said emitter electrode of said second transistor, an inductive element connected between said collector element of said second transistor and said other line, means including a receiver bridged between the emitter electrode of said second transistor and said one line, means including a portion of a hybrid resistance network coupling said collector electrode of said first transistor to said base electrode of said second transistor, whereby said receiver is substantially isolated from said network by said second transistor and the impedance of said set is rendered substantially resistive.

6. Apparatus in accordance with claim 5 wherein said means including said portion of said network comprises a fourth resistive element connecting said collector electrode of said first transistor to said one of said lines, a fifth resistive element and a second capacitive element in series relation connecting said collector of said first transistor to the base of said second transistor, and a sixth resistive element connecting the junction of said last named two elements to said other line, said fourth, fifth, and sixth resistors, said receiver, said transmitter and the telephone loop to which said lines are adapted for connection each comprising a leg of a hybrid circuit in Wheatstone bridge configuration.

7. Apparatus in accordance with claim 5 including a D-C equalization circuit connected in parallel relation to said transmitter and a receiver equalization circuit connected between said base electrode and said collector electrode of said second transistor.

8. Apparatus in accordance with claim 5 including a resistive element and a capacitive element in parallel relation connecting said collector of said second transistor to said one of said line.

References Cited

UNITED STATES PATENTS

| | | |
|---|---|---|
| 2,629,024 | 2/1953 | Edwards. |
| 2,950,351 | 8/1960 | Leman. |

KATHLEEN H. CLAFFY, Primary Examiner

W. A. HELVESTINE, Assistant Examiner

U.S. Cl. X.R.

179—81